April 28, 1931.   C. ROSATELLI   1,803,039
AEROPLANE CHASSIS
Filed Aug. 1, 1930
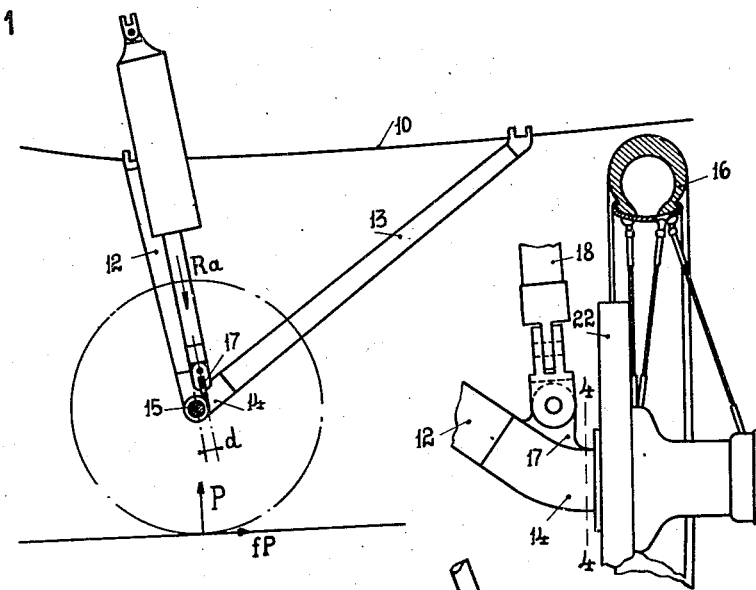
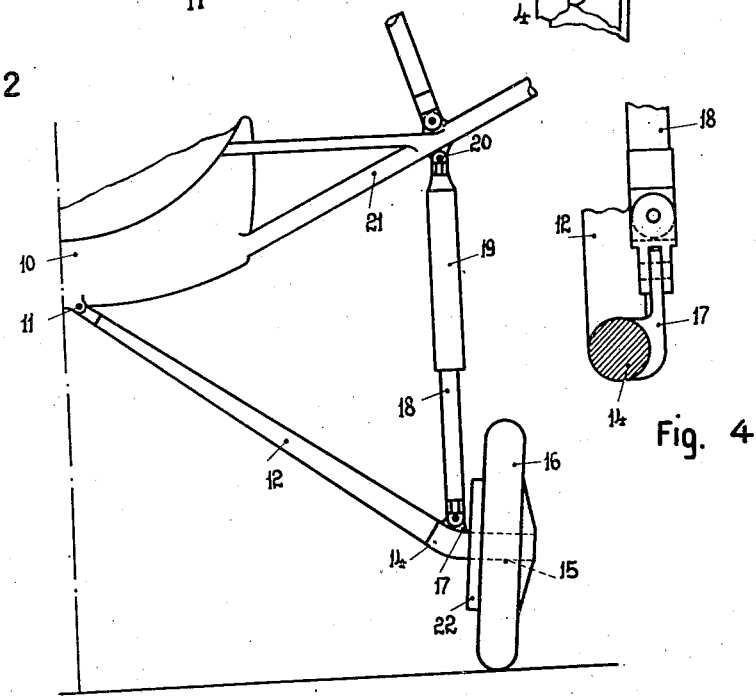
Inventor,
Celestino Rosatelli
By [signature]
atty.

Patented Apr. 28, 1931

1,803,039

UNITED STATES PATENT OFFICE

CELESTINO ROSATELLI, OF TURIN, ITALY, ASSIGNOR TO FIAT SOCIETA ANONIMA, OF TURIN, ITALY

AEROPLANE CHASSIS

Application filed August 1, 1930, Serial No. 472,412, and in Italy June 17, 1930.

It is known that by the use of brakes on aeroplane wheels for reducing the distance over which the flying machine rolls on the ground the chassis members are subjected to a strong torque stress which in addition to the other stresses acting thereon may cause breakage of the said structures.

The peculiar chassis shape which is now being generally adopted does not in many cases admit of the use of props for taking up the said torque stress.

It is therefore desirable to provide means for reducing the stresses due to the braking couple and the deformations of the system without any increase in size and weight.

By this invention a reaction couple is generated which acts on the same wheel axle subject to a torque stress through braking and said reaction couple balances and reduces the resilient deformations and stresses deriving therefrom.

According to this invention the axis of the resilient reaction member (hydraulic, pneumatic or other shock absorber) is suitably arranged on a different plane with respect to that of the wheel axle. The distance between both axes, suitably proportional to the weight of the flying machine, generates a torque couple opposing the braking couple.

The arrangement is such that the torque upon the wheel axle will have the same absolute value, whether the wheels be braked or not.

The attachment of the resilient reaction member to the wheel axle is such that the distance between the axes lying on different planes may be adjusted at will according to practical requirements.

The accompanying drawing shows diagrammatically a constructional form of the object of this invention.

Figure 1 is a side view of the device.

Figure 2 is a partial front view.

Figure 3 is an elevation on an enlarged scale showing a part of the chassis.

Figure 4 is a section on line 4—4 of Fig. 3.

Referring to the drawing, 10 denotes the fuselage of the aeroplane, to the lower face of which are pivoted to brackets 11 fixed to said fuselage by one end the members 12 and 13 of the chassis capable of oscillating in a cross direction. Said elements are connected together at their other end, e. g. by welding and the knot 14 thus formed carries the stub axle 15 on which the chassis wheel 16 is mounted. The elements 12 and 13, stub axle 15 and wheel 16 build up one-half of the chassis, the other half is not shown for simplicity's sake and is arranged symmetrically with respect to the longitudinal axis of the fuselage. The knot 14 is provided with a lateral projection 17 placed somewhat behind the vertical plane passing through the axis of the stub axle 15; the flap 17 carries pivotally attached thereto a tie 18 carrying a reaction and shock absorbing device 19 articulated at 20 to a bracket on the wing strut 21.

22 is a brake drum provided on the wheel 16.

Supposing P denotes the vertical reaction of the ground, $f$ the friction coefficient, R the wheel radius, the braking torque is $$M_t = RfP$$

Owing to the excentricity of the reaction member 18 a reaction couple is generated having a value $$M_r = R_a d$$

wherein $R_a$ denotes the reaction of the reaction member 18 and $d$ the excentricity, said couple having a direction opposite to $M_t$.

It is obvious that by suitably varying the excentricity $d$, the torque $M_t$ will be more or less balanced.

The excentricity does not impose upon the chassis members any substantial stresses such as would require an increase in weight and size affecting the streamline of the flying machine.

What I claim is:

1. In an aeroplane the combination with a chassis consisting of members oscillating about axes parallel to the longitudinal axis of the fuselage, stub axles carried by said members and wheels provided with brakes and rotatably mounted on said stub axles, of a tie articulated at one end to a part secured to the fuselage and at its other end to a lateral projection of the stub axle support and a shock absorber incorporated in said tie.

2. In an aeroplane the combination with a fuselage and wing struts, of a chassis comprising two rod couples pivoted at one end to said fuselage so as to oscillate on axes symmetrically arranged with respect to the longitudinal axis of the fuselage, the rods of each couple connecting at their opposite ends so as to form a knot, stub axles carried by said knots, wheels provided with brakes and rotatably mounted on said stub axles and resilient ties articulated at one end to said struts and excentrically at their opposite ends to the corresponding knots so as to generate a reaction couple for balancing the torque stress due to braking.

In testimony that I claim the foregoing as my invention, I have signed my name.

CELESTINO ROSATELLI.